(12) United States Patent  (10) Patent No.: US 8,038,335 B2
Tuli  (45) Date of Patent: Oct. 18, 2011

(54) APPARATUS FOR PROVIDING EVEN, FOCUSED ILLUMINATION OF A TARGET SURFACE

(76) Inventor: Raja Singh Tuli, Montreal (CA)

( * ) Notice: Subject to any disclaimer, the term of this patent is extended or adjusted under 35 U.S.C. 154(b) by 40 days.

(21) Appl. No.: 12/415,261

(22) Filed: Mar. 31, 2009

(65) Prior Publication Data

US 2010/0246206 A1  Sep. 30, 2010

(51) Int. Cl.
  *F21V 7/06* (2006.01)
(52) U.S. Cl. ........ 362/551; 362/555; 362/610; 362/612; 358/473
(58) Field of Classification Search .................. 362/612, 362/613, 555, 510, 800, 225, 217.02, 217.03, 362/217.04, 217.05
See application file for complete search history.

(56) References Cited

U.S. PATENT DOCUMENTS

| 5,471,371 | A  | * | 11/1995 | Koppolu et al. | 362/555 |
| 6,441,928 | B1 | * | 8/2002  | Tuli et al.    | 358/473 |
| 6,527,411 | B1 | * | 3/2003  | Sayers         | 362/245 |
| 6,607,297 | B2 | * | 8/2003  | Egawa          | 362/551 |
| 7,029,156 | B2 | * | 4/2006  | Suehiro et al. | 362/560 |
| 7,273,300 | B2 | * | 9/2007  | Mrakovich      | 362/249.01 |
| 7,478,941 | B2 | * | 1/2009  | Wu et al.      | 362/612 |

* cited by examiner

*Primary Examiner* — Anabel M Ton

(57) ABSTRACT

The present invention discloses improvements on an apparatus for reading a document by illuminating it with a beam of focused light, directing the reflected light to an array of optical sensors, digitalizing the resulting image and storing it for future use. It discloses several aspects of the light pipe element aimed at improving the illumination of the targeted area for the aforementioned purpose, including the shape of the light pipe ends, the use of a refracting coat on the back of the light pipe and the shaping of the light pipe front surface to focus the light rays on the target surface.

7 Claims, 3 Drawing Sheets

State of the art

APPARATUS FOR PROVIDING EVEN, FOCUSED ILLUMINATION OF A TARGET SURFACE

FIELD OF THE INVENTION

The present invention generically relates to document reading technologies. More specifically, the present invention addresses an apparatus for reading a document by illuminating it with a beam of focused light, directing the reflected light to an array of optical sensors, digitalizing the resulting image and storing it for future use.

BACKGROUND OF THE INVENTION

The typical contact-type reading apparatus features a series of standard elements that are herein detailed. First of all, the apparatus has a contact glass for keeping the surface of the document at a constant distance. A linear array of light-emitting diodes (LEDs) is used for illuminating the portion of the document to be read. Said LED array sends rays of light through a light guide, which purpose is to focus the light onto the surface of the document to be read. Usually the LED array and the light guide span the entire reading length of the apparatus. The incident rays of light are reflected by the illuminated portion of the document surface, and the reflected rays are focused by an array of optic fiber lenses onto an array of optical sensors. This optical sensor array comprises one or more solid state devices deploying multiple individual photo cells in a linear array. Said optical sensor converts the image focused onto it in electrical signals that are digitally codified, resulting in a digital image that can be stored in an internal memory for future use.

This same concept does not lend itself to application in smaller scales, namely for portable contact-type reading apparatuses. Properly even illumination of the document surface is critical to the performance of the device, and so an array of LEDs spanning the entire length of the reading apparatus is normally required. Such an array would entail a larger size incompatible with the desired small dimensions of a portable device. Furthermore, the amount of energy required to simultaneously power the range of LEDs would require sizeable battery storage capacity, again yielding incompatibility with a small sized device.

The prior art includes U.S. Pat. No. 6,441,928 by the same Applicant, which discloses a different approach wherein the linear array of LEDs is replaced by a light pipe. Said light pipe comprises a clear pipe made of glass or plastic, with a single LED deployed at each end. Considering as reference a plan containing the central longitudinal axis of the light pipe, the section above said plan is termed the back of the light pipe, while the other section is termed the front of the light pipe, where the contact glass is located and where the paper surface is positioned for reading. The use of only two LEDs overcome the power requirement problem, but introduces the need to properly direct the LEDs light rays towards the document surface. The inside back surface of the pipe is painted white, forming a reflective surface. As the LEDs discharge light rays through the pipe, part of said light rays is reflected by the white paint, causing the light to scatter and disperse evenly, therefore illuminating the document as it passes over the contact-glass. Then, the illuminated portion of the document is reflected by the surface of the document, passes through a waveguide and is focused by an optical lens array onto an optical sensor array integrated in the portable contact-type reading apparatus. The optical sensor array converts the image received into electrical signals to produce a digital image to be stored in an internal memory.

Although it addresses the basic problem of making the contact-type reading apparatus compact and reducing electric power demand, the device disclosed in U.S. Pat. No. 6,441,928 still has some inconveniences. The illumination potential of the LEDs is not fully tapped, and the resulting image resolution—critical for the device performance—falls short of what would be afforded by better illumination.

SUMMARY OF THE INVENTION

According to one of its aspects, it is an object of the present invention to disclose a hand-held scanner which optimizes the illumination performance of the LED. The structural and functional description of the original device can be found in U.S. Pat. No. 6,441,928 by the same Applicant, which is herein fully incorporated by reference. The improvements will be described as they relate to such disclosure.

BRIEF DESCRIPTION OF THE DRAWINGS

A more complete understanding of the present invention may be had by reference to the following detailed description when taken in conjunction with the accompanying drawings, wherein.

DESCRIPTION OF THE PREFERRED EMBODIMENTS

The invention will now be described with reference to the figures. The figures are intended to be illustrative rather than limiting and are included herewith to facilitate the explanation of the invention.

Figure 1:
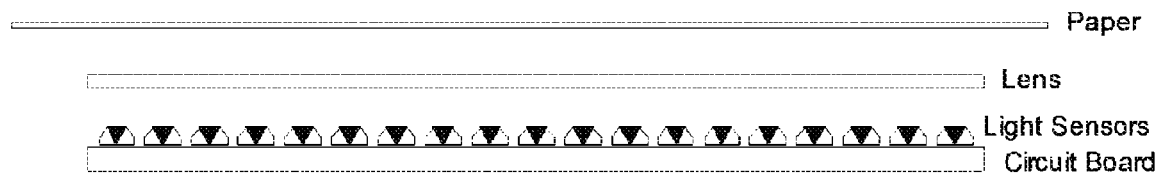
FIG. 1 is a side elevation view of an aspect of the invention illustrating the compact contact-type reading apparatus.

FIG. 1 illustrates the basic configuration of the device, including a linear array of light sensors positioned along a circuit board, the front of the light pipe that configures a lens, and the paper that is being scanned. Light is reflected from the paper and the image is digitalized by the sensors.

Figure 2:
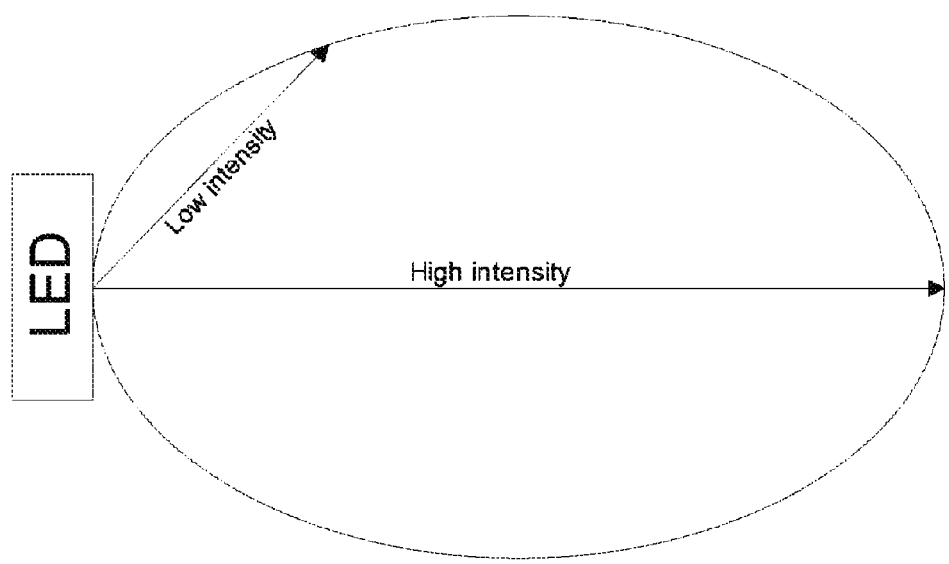
FIG. 2 is a schematic depiction of an aspect of the invention illustrating the beam pattern of a standard LED.

The typical LED employed in the present invention presents a pattern of light emission as illustrated in FIG. 2, with most of the light directed around a central cone with the LED central surface at the apex.

Figure 3:
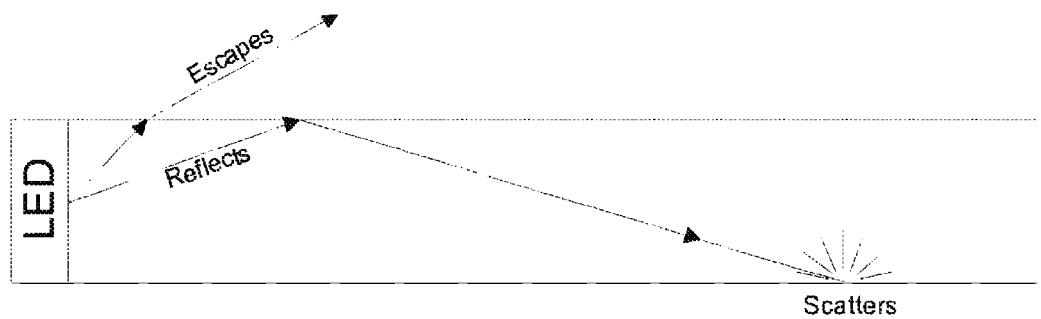
FIG. 3 is a schematic depiction of an aspect of the invention illustrating the path of exemplary light rays upon hitting the right-angled internal surface of the light pipe according to the state of the art.
Figure 4:
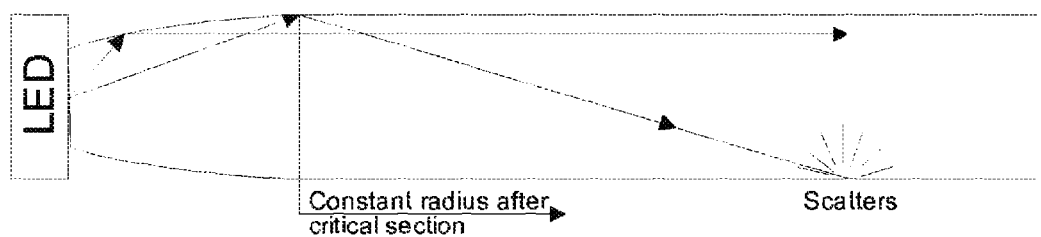
FIG. 4 is a schematic depiction of an aspect of the invention illustrating the path of exemplary light rays upon hitting the rounded internal surface of the light pipe according to the invention.

As illustrated on FIG. 3, the prior art recited the shape of the light pipe as a cylinder, with a LED positioned on either end and facing inwards. The light rays originating from the LED would hit the clear cylindrical surface of the light pipe at various angles, and the rays would refract or reflect according to the refractive index of the media and the angle of incidence. The critical angle of incidence is the one closest to the normal at which total reflection ensues. The incidence of a ray of light in sub-critical angle entails its "loss" to the outside of the light pipe as refracted light, instead of the desired total reflection that would direct this ray back towards the inside of the light pipe where it would eventually scatter. The scattering of the reflected light ray contributes to the object of the invention. In a preferential embodiment of the present invention, as illustrated on FIG. 4, the light pipe collects a plurality of light rays emitted from the LEDs, and the shape of the light pipe is such that the internal diameter of the cylinder increases along the longitudinal axis of the light pipe, becoming constant only after the section where an incident light ray would have a critical incidence angle. The resulting domed profile ensures that no portion of the light originated from the LED escapes the interior of the light pipe by refracting through its clear wall. The eventual scattering of all the light rays actively contributes to optimizing the illumination potential of the LEDs and ultimately to increasing the resulting image resolution achieved by the compact contact-type reading apparatus. More specifically, the rate of the cross-section reduction of the tapering portion is selectively adjusted to cause total internal reflection of a higher proportion of the plurality of light rays that originate from the light source than would be the case with a constant cross section.

Figure 5:
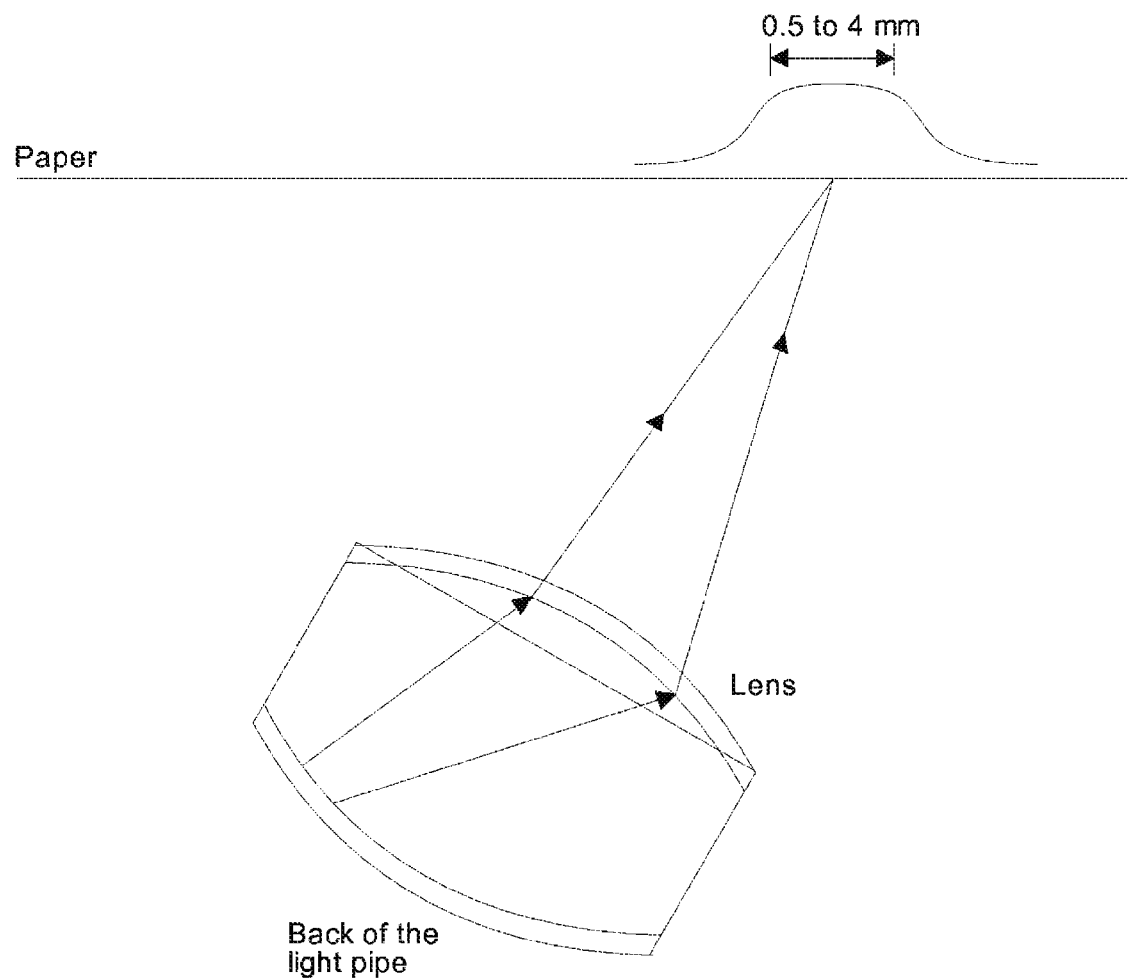
FIG. 5 is a schematic axial view of an aspect of the invention illustrating the geometric profile of the light pipe and the lens array, depicting the path of exemplary light rays upon hitting said surfaces. The top portion illustrates the light intensity distribution upon hitting the surface of the paper.

The shape of the inside back surface of the light pipe, where the reflective surface is formed, is recited as a plan surface in the prior art. In a preferential embodiment of the present invention, as illustrated on the top portion of FIG. 5, the inside back surface of the light pipe, where the reflective surface is formed presents a concave shape. Furthermore, a portion of the outside surface of the light pipe, positioned on a region radially opposite to the region that faces the target, features a refractive coating facing the inside of the light pipe. As the surface as seen from the inside of the light pipe in this same region is concave, the light rays incident on this surface from the inside of the light pipe either are reflected or refracted back towards the inside of the light pipe, thus contributing to the illumination of a target surface. Both reflection and refraction occur here; in both cases an incident light ray is deviated in the general direction of the target surface. While the concave shape of the surface deviates both, the refractive painting affects only the sub-critical incident/refracted rays. Even though the optical phenomenon occurring when the LED-produced light rays hit the refractive surface is scattering—which amounts to multiple reflection angles—the concavity of the reflective surface results in preliminary concentration of the light rays in the direction of the scan line, which is conductive to the purposes of the invention. Therefore, either by reflection (for super-critical incidence) or refraction (sub-critical incidence), the incident light rays are directed away from the inside back surface of the light pipe and onto the scan line of a document.

Once scattered upon hitting a point of the concave reflective surface of the light pipe, the light rays leave the interior of the light pipe passing through the region of the light pipe's surface aligned with the scan line of the device. In a preferential embodiment of the present invention, as illustrated on the bottom portion of FIG. 5, the transparent surface of the light pipe, more specifically in the area from where the light rays are to emerge towards the target surface, has its shape designed to act as a focusing lens. Thereby it provides additional focusing of the light rays emerging through the surface of the light pipe towards the scan line of the document to be scanned, thus further contributing for the illumination of the scan line.

One aspect to consider is that even though the light pattern that emerges from the light pipe has been intentionally concentrated into a narrower shape by means of the previously described arrangements, it is not a focused beam of light. In fact that is suitable for the purposes of the invention, as a slightly diffuse band of light is more desirable. The mechanical tolerances incorporated in the device are such that there is no way to ensure that the scan line in every device is perfectly centered. In other words, instead of devising a way to precisely locate the considerably small scanning frame—for instance 300 by 600 dpi in size—and then devising a way to concentrate all the light available into this small area, the present invention's approach is to consider the tolerances involved and directing the light to a more practicable distribution. Namely, in a preferential embodiment of the present invention, as illustrated on the top portion of FIG. 5, the focusing lens arrangement is conformed to yield a cross-sectional pattern of light distribution with a plateau shape, yielding a band of evenly distributed light covering a strip between 0.5 mm and 4 mm wide on the target surface.

While this invention has been particularly shown and described with reference to a preferred embodiment, it will be understood by those skilled in the art that various changes in form and detail may be made therein without departing from the spirit and scope of the invention.

I claim:

1. Apparatus for providing even, focused illumination of a target surface comprising a longitudinally straight, elongate light pipe made of a transparent material, with light sources disposed at least on one end; a cross-section that is constant in a central region and tapers towards at least one end, wherein the rate of the cross-section reduction of the tapering portion is selectively adjusted to cause total internal reflection of a higher proportion of the plurality of light rays that originate from the light source than would be the case with a constant cross section.

2. Apparatus according to claim 1, wherein the light pipe has a substantially circular cross-section.

3. Apparatus for providing even, focused illumination of a target surface comprising a longitudinally straight, elongate light pipe defining a longitudinal axis, being the light pipe made of a transparent material featuring a certain refraction index, with light sources disposed at least on one longitudinal end, a first lateral surface substantially parallel with said longitudinal axis and painted with a refractive coating strip and a second lateral surface, opposite to the first surface and facing the target surface, wherein the proportion of light rays incident on the first surface from the inside of the light pipe that are either reflected or refracted back inside the light pipe towards the second surface for contributing to the illumination of the target surface is increased by making the first surface substantially concave instead of flat.

4. Apparatus according to claim 3, wherein the light refractive coating strip applied to the first substantially concave surface extends longitudinally from end to end of the light pipe.

5. Apparatus for providing even, focused illumination of a target surface comprising a longitudinally straight, elongate light pipe defining a longitudinal axis and a lateral surface substantially parallel to said longitudinal axis, being the light pipe made of a transparent material featuring a certain refraction index, with light sources disposed at least on one longitudinal end; wherein the lateral surface of the light pipe, specifically in the region from where the light rays are to emerge towards the target surface, has its shape selectively adjusted to act as a focusing lens for illuminating the target surface.

6. Apparatus according to claim 5, wherein the focusing lens is shaped to yield a cross-sectional pattern of light distribution with a plateau shape, yielding an elongated band of evenly distributed light substantially parallel with the longitudinal axis and covering a strip between 0.5 and 4 mm wide on the target surface.

7. Apparatus according to claim 3, wherein a cross-sectional shape of the lightpipe is constant in a central region and tapers towards at least one end, and where the combination of said cross-sectional shape and the positioning of the refractive coating strip at the first surface increases the proportion of light rays that are refracted by the refractive coating strip and then either reflected back inside the lightpipe or refracted through the second surface for contributing to the illumination of the target surface.

\* \* \* \* \*